(12) United States Patent
Zubiria Elizondo et al.

(10) Patent No.: US 10,000,004 B2
(45) Date of Patent: Jun. 19, 2018

(54) PROCESS OF OBTAINING A DOUBLE-ORIENTED FILM, CO-EXTRUDED, AND OF LOW THICKNESS MADE BY A THREE BUBBLE PROCESS THAT AT THE TIME OF BEING THERMOFORMED PROVIDES A UNIFORM THICKNESS IN THE PRODUCED TRAY

(71) Applicant: ZUBEX INDUSTRIAL SA DE CV, Monterrey (MX)

(72) Inventors: Miguel Jorge Zubiria Elizondo, Monterrey (MX); Jose Juan Valadez Lopez, Monterrey (MX)

(73) Assignee: ZUBEX INDUSTRIAL SA DE CV, Monterrey (MX)

( * ) Notice: Subject to any disclaimer, the term of this patent is extended or adjusted under 35 U.S.C. 154(b) by 0 days. days.

(21) Appl. No.: 14/973,198

(22) Filed: Dec. 17, 2015

(65) Prior Publication Data

US 2016/0200030 A1    Jul. 14, 2016

(30) Foreign Application Priority Data

Dec. 19, 2014 (MX) .................. MX/A/2014/016023

(51) Int. Cl.
*B29C 51/02* (2006.01)
*B29C 47/00* (2006.01)
(Continued)

(52) U.S. Cl.
CPC .......... *B29C 51/02* (2013.01); *B29C 47/0014* (2013.01); *B29C 47/0026* (2013.01); *B29C 47/0054* (2013.01); *B29C 47/06* (2013.01); *B29C 47/881* (2013.01); *B29C 55/26* (2013.01); *B29C 55/28* (2013.01); *B29D 23/00* (2013.01); *B29C 47/0057* (2013.01); *B29C 47/0059* (2013.01); *B29C 47/065* (2013.01); *B29C 47/8805* (2013.01); *B29C 47/8825* (2013.01);
(Continued)

(58) Field of Classification Search
CPC ............ B29C 47/0014; B29C 47/0026; B29C 47/0054; B29C 47/0057; B29C 47/0059; B29C 47/06; B29C 47/065; B29C 47/56; B29C 47/8805; B29C 47/881; B29C 47/8825; B29C 47/8895; B29C 51/02; B29C 51/14
See application file for complete search history.

(56) References Cited

U.S. PATENT DOCUMENTS

| 5,632,133 A * | 5/1997 | Wyslotsky ............... B29C 51/14 53/140 |
| 6,726,363 B1 * | 4/2004 | Marbler .................. B65B 61/02 383/116 |
| 2009/0269580 A1 * | 10/2009 | Shiba ..................... B32B 27/32 428/340 |

FOREIGN PATENT DOCUMENTS

| CA | 2291207 | 6/2000 |
| MX | MX2009001376 A | 8/2009 |

* cited by examiner

*Primary Examiner* — Lawrence Ferguson
(74) *Attorney, Agent, or Firm* — Defillo & Associates, Inc.; Evelyn A. Defillo

(57) ABSTRACT

The present invention relates to provides a double-oriented film, co-extrude, and of low thickness, with a layered composition that gives the property of being of high barrier to gases and manufactured by the process of co-extrusion of 3 bubbles, which gives the property of when being thermoformed, ensure the distribution of uniform thickness in the walls, base, folds, and corners of the formed tray saving a minimum of 50% of plastic without diminishing its gas barrier and its resistance to puncture.

6 Claims, 5 Drawing Sheets

(51) Int. Cl.
  *B29C 47/06*   (2006.01)
  *B29C 47/88*   (2006.01)
  *B29D 23/00*   (2006.01)
  *B29C 55/26*   (2006.01)
  *B29C 55/28*   (2006.01)
  *B29C 51/14*   (2006.01)
  *B29C 51/26*   (2006.01)
  *B29K 23/00*   (2006.01)
  *B29K 77/00*   (2006.01)
  *B29K 105/00*   (2006.01)
  *B29L 31/00*   (2006.01)
  *B29K 105/02*   (2006.01)

(52) U.S. Cl.
  CPC .......... *B29C 47/8895* (2013.01); *B29C 51/14* (2013.01); *B29C 51/264* (2013.01); *B29K 2023/00* (2013.01); *B29K 2023/086* (2013.01); *B29K 2077/00* (2013.01); *B29K 2105/02* (2013.01); *B29K 2105/258* (2013.01); *B29L 2031/712* (2013.01); *B29L 2031/7162* (2013.01)

PROCESS OF OBTAINING A DOUBLE-ORIENTED FILM, CO-EXTRUDED, AND OF LOW THICKNESS MADE BY A THREE BUBBLE PROCESS THAT AT THE TIME OF BEING THERMOFORMED PROVIDES A UNIFORM THICKNESS IN THE PRODUCED TRAY

OBJECTIVE OF THE INVENTION

An objective of the present invention is to provide a double-oriented film, co-extruded, and of low thickness, with a layered composition with the property of being of high barrier to gases and manufactured by the process of 3 bubbles co-extrusion, which provides the property of the thermoforming, ensure the uniform thickness distribution in the walls, base, folds, and corners of the formed tray with a plastic saving of minimum 50% without diminishing its barrier to gases and its resistance to puncture.

BACKGROUND

In recent years have been developed technologies around the plastics industry, specifically in the polymer films directed to the packaging, which may be packaging for medical devices, foods, among others. These packages need to have specific properties that allow them to be subjected to processes such as thermoforming and high vacuum to ensure the quality of the product or products that contain.

Specifically, the food industry uses flexible thermoforming films for high vacuum packaging of products by presentation tray type with lid. The main problem of this process is the thinning of the corners and folds of the tray by not giving the films the ability to distribute its thickness along the perimeter of the mold. That is, the walls and floor are thicker than the corners. The corners and folds, by being thinner, reduce the gas barrier capacity affecting the shelf life of the packaged product.

To achieve a thickness of not less than 1 mil of an inch in the folds and the corners, films with thicknesses in proportion to 1 mil of an inch for each 1 cm of depth of the tray are used. This factor is derived to ensure a minimum thickness of 1 mils in the folds and the corners, it is to be considered that much of the thickness will remain in the walls and the floors. So that if a tray is 7 cm in depth, it is recommended to use a film of 7 mil of inch.

Some of the technologies developed in the area of packaging:

Canadian patent number CA2291207 details laminated films formed on cold, for example, for the manufacture or the blister type packaging, or the bases for the shapes of the containers or profiled parts for medical instruments packing and applicators. The film contains a barrier layer, which is impermeable to gases and water vapor, and a layer of plastic on both sides of the barrier layer. Laminated film has a layer structure in the following order: a.) a plastic layer in the form of a film of the following type, namely, polyvinyl chloride, polyester, polypropylene, polyamide, cycloolefin copolymer or a molten film of polyvinyl chloride or polypropylene, b) a metal sheet, such as an aluminum plate, and c) a polyamide oriented film that has a thickness of 25 to 32 um; the free sides from the first and/or second plastic film may have a sealing layer or films of the first and/or the second of plastic can be sealable. The laminated films can be processed, for example, by cold type stretching or forming mechanic tools. During the preparation of laminated film, the stretching is safely maintained between the matrix and the support, while the shaping tools keep the laminated in the desired form; it is mentioned the development of a plastic film obtained by laminated, and not by blowing as the invention to be protected, however it is quoted within this chapter since the inventors make emphasis in that the film or sheet to be molded to its final form through shaping tools in the absence of heat, maintains its thickness avoiding the gases or steam filtration, however it is done by cold means.

The Mexican Patent Application No. MX2009001376 relates to a film of multiple substrates, heat shrinkable, thermoforming, and sealable having a symmetrical construction around an internal substrate of two substrates and that has a heat shrink capacity in the machine direction and in the transverse direction in each case of at least 20% to 93° C. The heat shrinking capacity is not substantially affected by the thermoforming, and also relates to methods by which the film with multiple substrates of the invention can be processed advantageously for a heat shrinking packing, more particularly using packing machines specially packaged. This reference provides a multiple substrates film, heat shrink, thermoforming, and sellable, however the present invention to facilitate their thermoforming, includes a previous cross-linking process by electron irradiation. In the same way it's necessarily a symmetric film (the polymer of the inner and outer layers must be equal, a polyolefin). Do not use the three bubbles process, so the novelty of the present invention is not affected.

Entering a little more in detail on the processes that are followed in the thermoforming, the routine process that high vacuum thermoforming and packing machine uses is:

a) the equipment is fed with a high thickness film (Bottom Web).

b) This film is heated by electric resistances by determined time and temperatures by the film maker.

c) By means of vacuum, the film is sucked up to form a cold mold(s) which is underneath of it.

d) when contacting the sides of the mold, the film solidifies and gives shape to a tray.

e) This tray advances and food packed is deposited on it (sausage, cheese, meat, etc.).

f) The tray continues advancing and over the tray is applied a film (Top Web or Lidding Film), normally printed, and both enter into a vacuum chamber and sealing.

g) Packages already packed by high vacuum are cut to be marketed.

Commonly, the films for food thermoforming and packing are manufactured in a bubble co-extrusion equipment and in flat sheet co-extrusion equipment, these films can be mono-layer or multi-layer (2 or more layers). Additionally, in some cases to these co-extrusions are laminated with other mono or multi-layer plastic film, to give the required thickness, which in the industry is approximately one mil of inch for each inch of depth (1 mil/1 cm) of the tray to be formed, by which it should be noted that the most important one of these films is their property of being evenly formed. It is often the case that when being formed, some films become thin over the corners or folds on the tray, since the entire thickness of the film remains on the sides and base not in the corners or folds, and when the thickness is less than one mil, there is a risk that the barrier of the film is lost to such a level that affect the shelf life of the food.

Figure 2:
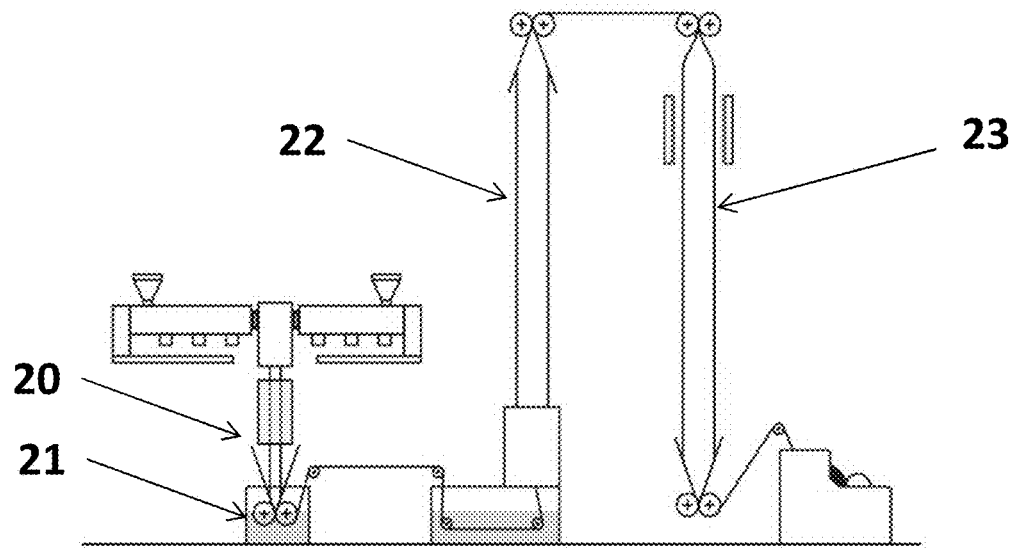
Figure 3:
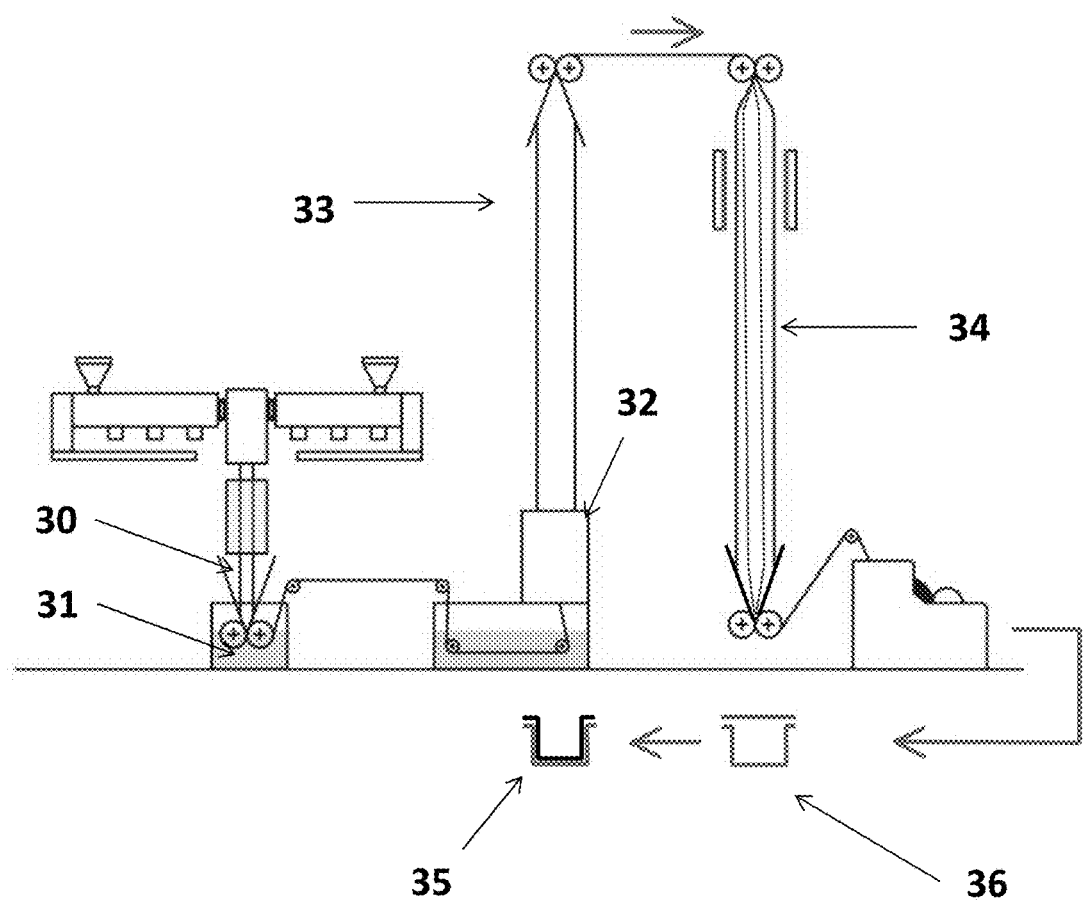
Figure 4:
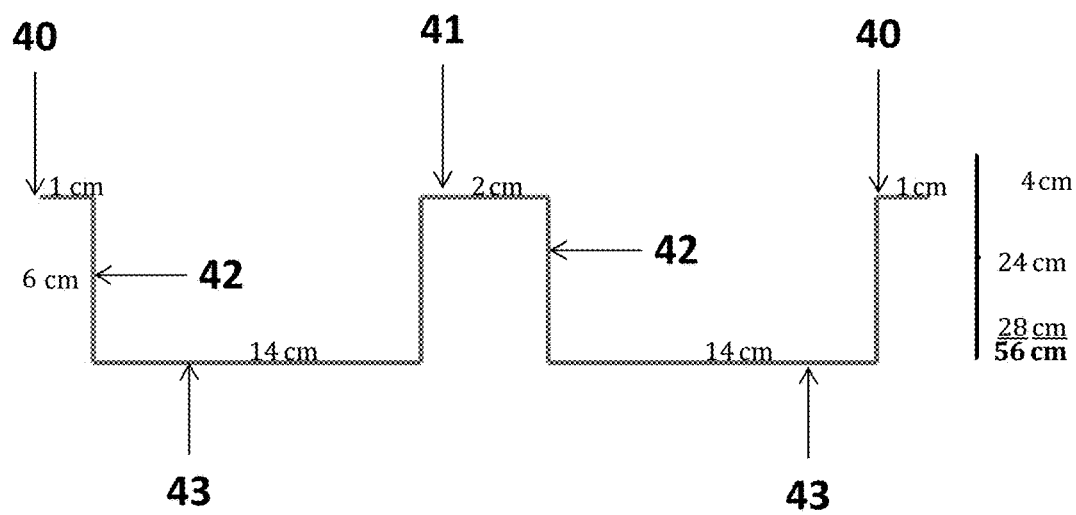
Figure 5:
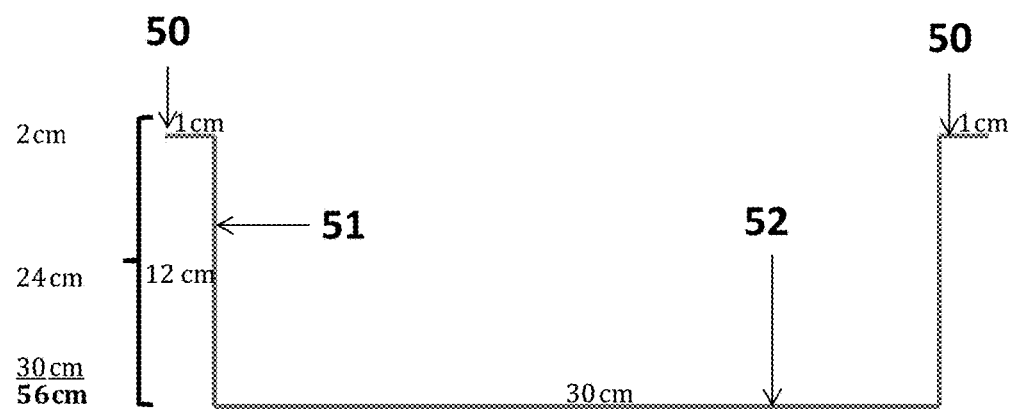
Figure 6:
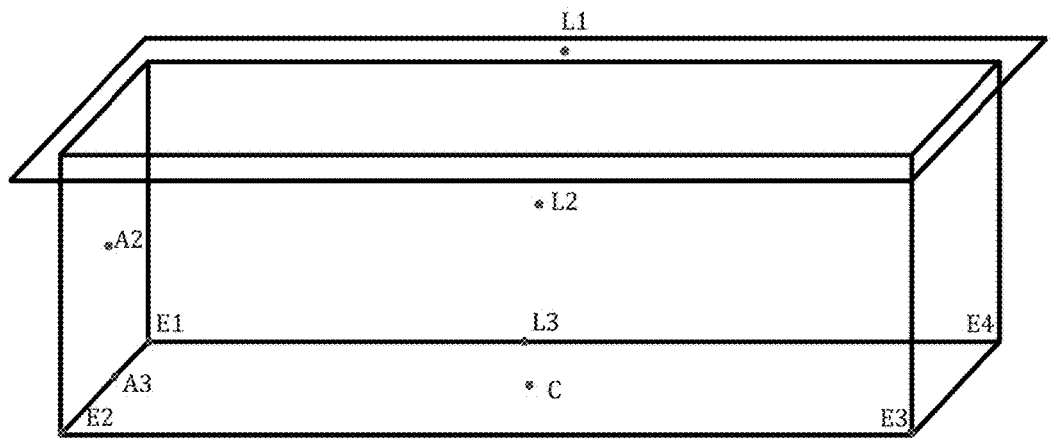
Figure 7:
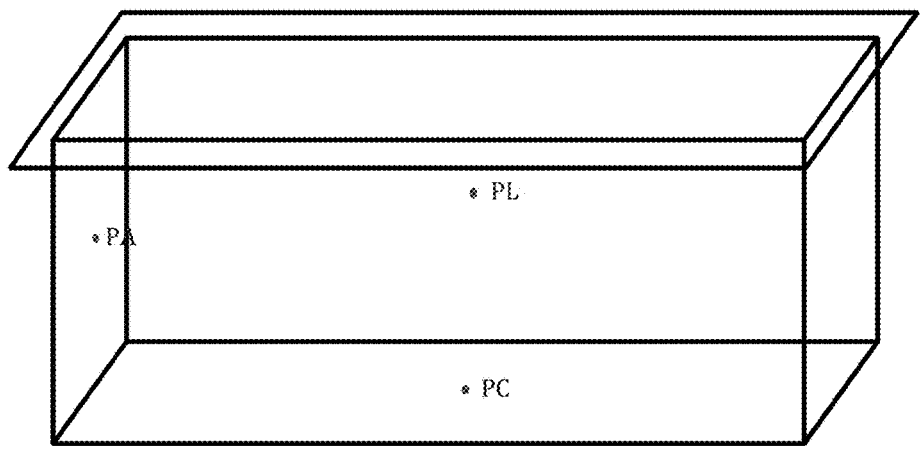
Figure 8:
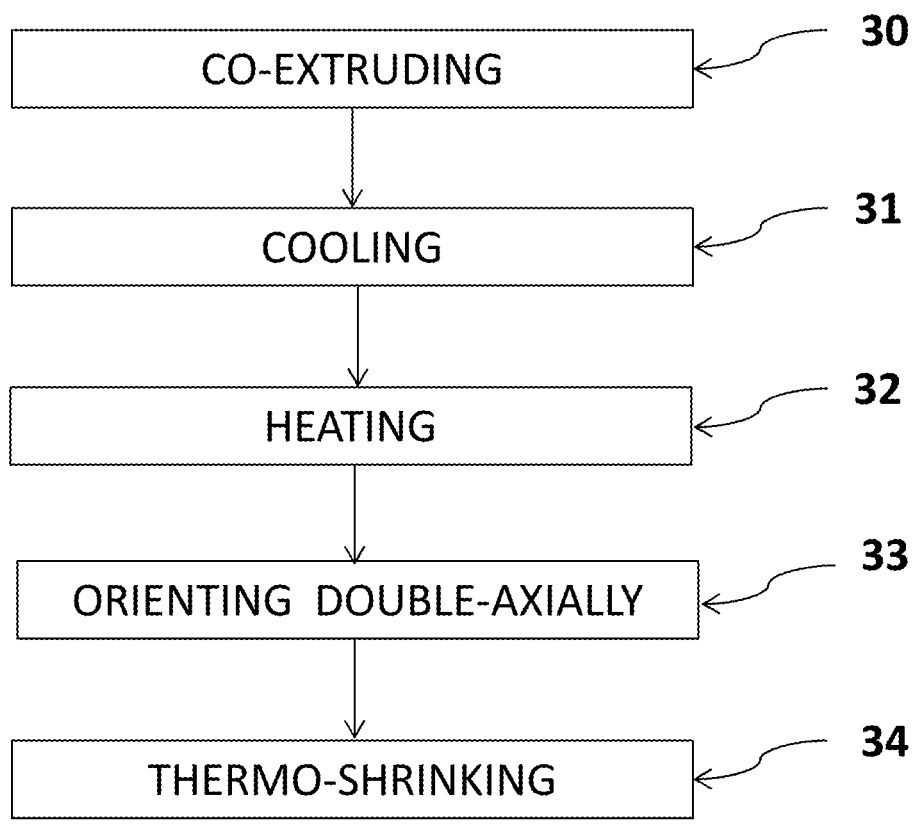

and a thermoformed tray (2) with the film to be protected, showing the uniform thickness of the same;

FIG. 2 shows a diagram of the process of a conventional triple bubble double-oriented process;

FIG. 3 shows a diagram of the process of obtaining a low thickness film that at the time of being thermoformed, possesses a uniform thickness, where all the stages are outlined;

FIG. 4 shows a schematic representation of the determination of the dimension of the obtained film for thermoforming two trays;

FIG. 5 shows a schematic representation of the determination of the dimension of the obtained film for thermoforming a tray;

FIG. 6 shows an isometric view of the tray showing the points of the tray where the thickness measurement was done once it was thermoformed from the film of the present invention;

FIG. 7 shows an isometric view of the thermoformed tray showing the points where the puncture strength was measured; and FIG. 8 shows a flowchart detailing the steps of the process of obtaining a low thickness film that at the time of being thermoformed, possesses a thick uniform.

DETAILED DESCRIPTION OF THE INVENTION

The present invention provides a low thickness film that at the time of being thermoformed possesses a uniform thickness, so the present invention has the advantage of being double-oriented and pre-shrunk in order to cover the requested perimeter of the film to form the tray(s) during the thermoforming process, so the film is inflated to achieve the final dimension and subsequently is thermo-shrunk to reach the initial film dimension required to be used in the thermoforming machine.

Figure 1:
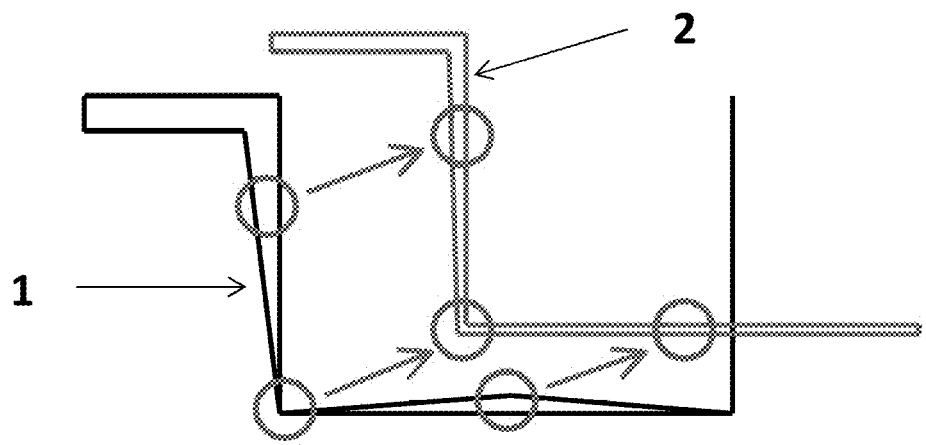
FIG. 1 shows a side view where you can see the thickness of walls and base of a thermoformed conventional tray (1)

The advantage of the present invention is that previously the film has the dimension and thickness to which is going to be thermoformed, so it gives the property so effortlessly and with a uniform thickness on all the walls, floors, folds and corners in the thermoforming process of the food trays (2), as shown in FIG. 1 so it prevents the buildup of material in walls and floors, allowing to reduce the thickness that normally is used in the industry. By what the present invention offers from 0.6 mils or less per 1 cm of depth of the tray, instead of 1 mil per 1 cm of depth that is commonly used for the thermoforming of the conventional trays (1).
Triple Bubble Conventional Bi-Directional Process FIG. 2 shows a process of a conventional triple bubble double-orientation process, in which in the first bubble (20), it is extruded an initial tube of a predetermined measurement in which it is cool (21) with cold water to prevent their crystallinity; then, this tube is heated (22) to be expanded in both directions in a controlled manner. Later in the third bubble (23) it is stabilized by means of heat to avoid shrinkage or ensure its dimensional stability; the three bubble technology is well known to anyone with technical knowledge in this matter, so it will not provide greater detail for practical purposes.

In the present invention, it is taken as a base the same process of the three bubbles, it is also extruded initially a plastic tube (film), said tube it is cooled with ice water to avoid its crystallinity; then the tube is heated and double-oriented in a second bubble to the extent in which the film will have the capacity to cover the perimeter of the mold used for the thermoforming process, to determine the perimeter of said mold it is considered, in addition to the walls and base, the dimension of the area of the seal; finally in the third bubble, the film is shrunk by means of heat to give the dimension of the initial film (prior to the thermoforming).

For a better understanding in the present invention, the process objective of the invention is illustrated with the help of FIG. 3 and FIG. 8, where one can appreciate the steps in detail:

a) Co-extruding (30) a multi-layer tubular strip in a first bubble, where the tubular strip has a dimension of 20 mm to 240 mm;

b) Cooling (31) the multi-layer co-extruded tubular strip on the step a) by immersing the strip in water until the strip reaches a temperature between 10 to 50° C. to obtain an amorphous multi-layer tubular strip, i.e. it is non-crystalline;

c) Heating (32) amorphous multi-layer tubular strip obtained in step b) at a temperature of between 70 to 90° C., in order to facilitate the double-orientation of step d).

d) orienting (33) double axially the multi-layer tubular strip heated in stage c) in a second expansion bubble to obtain the required dimension to cover the perimeter of at least one mold in a thermoforming equipment; and e) Thermo-shrinking (34) from 30 to 50% of the double axially oriented film on the step until reaching the required dimension by a thermoforming process and obtain a film of low thickness (36) that at the time of be thermoformed has a uniform thickness.

With this process of obtaining a low thickness film that at the time of being thermoformed has a uniform thickness, ensures that the film is easily thermoformed and on an evenly manner, so it can be considered a film of 0.5 mil per inch of depth of the mold since the film thickness is distributed prior to the thermoforming (37) to all the trays, since at the thermoforming step returns to the same dimension that had in stage b) double-orientation (33).

Table 1 provides the composition of the film objective of the present invention, which is shown below, the film includes five plastic layers, and can be from 3 up to several number of layers:

TABLE 1

Composition of low thickness film that at the time of being thermoformed possesses a uniform thickness.

| RESIN | PROPORTION |
|---|---|
| Polyamide 6, 6.66 | From 20% to 40% |
| EVOH (Ethyl Vinyl Alcohol) | From 0.01% to 10% |
| Sealing Agent | From 10% to 15% |
| Poly olefin | From 20% to 30% |

The polyamide is selected from the group consisting of Nylon 6 homopolymer, Nylon 6/66 copolymer, Nylon 6/12 copolymer, ethyl vinyl alcohol having a copolymer with at least 35% mol of ethyl vinyl alcohol; the sealing agent is selected from the group consisting of vinyl acetate polymer with an anhydrous ethylene modified or a polyolefin modified with a functional group that promotes adherence to different plastics; the polyolefin is selected from the group consisting of low density polyethylene (LDPE) and polyethylene of low linear density (LLDPE), metallocene polypropylene; its thickness is 0.4 to 0.7 mil by every centimeter of depth of the tray in a thermoforming process; the film has a maximum grade of thermo-shrink, once thermoformed from 5 to 30%, once immersed in a water bath at 80° C. for at least 1 second.

Example 1: Determination of the Dimension of the Film Obtained to Thermoform Two Trays Assuming that there is a thermoforming device that the width and film requirement is 322 mm (32 cm) and has, as shown in FIG. 4:
At the top (40) 1 cm on each side and 2 cm at the center (41) for the sealing of the lid.
2 cavities to form two trays of 6 cm of depth (42) each. Each tray has floor wide (43) of 14 cm.
Considering the above, the perimeter (sum of all its sides) or requested formed film, from 560 mm (56 cms). This will be the minimum dimension of the blowing in the second bubble of the present process. The third bubble, will be thermo-shrunk to the 322 mm required by thermoforming machine.

Example 2: Determination of the Film Dimension Obtained to Thermoforming a Tray

Assuming that the same machine from example 1, in which the center is removed (2 cms) to seal seeking a larger tray as a final product and with a depth (51) of 12 cm, sides (50) of 1 cm, and a bottom (50) of 30 cm, leaving the structure as shown in FIG. 5.
The perimeter or film requirement would be the same, 560 mm (56 cms), whereupon the film of the previous case will function without problem.
From the two previous examples can be considered:
In example 1, the ratio is 0.58 mil of film for every centimeter of depth.
In example 2, with the same film, it will apply 0.30 mil of film for every centimeter of depth.
In both examples the original thickness would be 3.5 mil instead of 6 mil for the first example and 12 mil for the second.
If a conventional film (1 mil/1 cm), outside of 7 mil of thickness, when measuring the thickness of the package (tray) would be observed that from top to bottom the walls begin with a thickness of 7 gradually going down to 1-1.3 mil in the bend that connects the wall with the bottom. The bottom would also increase the thickness from 1 to approximately 3 mil in the center, going down back to 1 mil at the other end.
With the present invention, a film with a thickness of 3.5 mil of a tray of 7 mil is used, the sides, folds and corners, average between 1.5 to 2 mil of an inch.
Another additional advantage of the present invention is that the tray can be thermo-shrunk (reduce its dimension) once packed up to 25% when submerged in water at 80° C.

Example 3: Evaluation of the Thickness on Different Sides of the Thermoformed Tray from the Film of the Present Invention A measurement of the thickness in different points of the thermoformed tray was made from the film of the present invention, where the film features 3.5 mil of an inch before being thermoformed versus existing in the market, which must have 7 mil of an inch of thickness prior to thermoforming in order to obtain the same dimension as the present invention, but it was observed a saving on material. In the same way in FIG. 6, there is illustrated the points of the thermoformed tray that were considered to make thickness measurements; such measurements are listed in the Table 2 below:

TABLE 2

Comparison of the results of the measurements of the thickness between the present invention and film that currently exists.

| | | Type of film | |
|---|---|---|---|
| | | Conventional film | Low film thickness (invention) |
| | | Depth of the thermoformed tray | |
| | | 7 "cms" | 7 "cm" |
| | | Film thickness prior to the thermoforming | |
| | | 7 "mil" | 3.7 "mil" |
| EVALUATED POINTS | E1 | 1.3 | 1.9 |
| | E2 | 1.15 | 1.8 |
| | E3 | 1.25 | 1.7 |
| | E4 | 1.35 | 1.7 |
| | L1 | 7 | 3.5 |
| | L2 | 4.1 | 3 |
| | L3 | 2.5 | 1.8 |
| | A2 | 2.3 | 2.3 |
| | A3 | 2.2 | 2.2 |
| | C | 3.2 | 2.3 |

Example 4: Evaluation of the Puncture Force ($lb/in^2$) of the Thermoformed Film An evaluation of the force of puncture was made in which film (invention) includes 3.5 mil of an inch before being thermoformed versus the film existing in the market, the evaluated points are observed in FIG. 7 and the results are listed in Table 3.

TABLE 3

Comparison of the results of the evaluation of the puncture forces between the present invention and film that currently exists (conventional), where PL: long puncture; PA: wide puncture; and PC: central puncture.

| | Tray Depth * | |
|---|---|---|
| | 7 "cm | 7 "cm |
| | Type of film | |
| | Conventional film | Low thickness film (invention) |
| PL $lb/in^2$ | 20.6 | 22 |
| PL $lb/in^2$ | 18.7 | 16 |
| PL $lb/in^2$ | 20.6 | 19 |

Having described enough my invention, I consider it as a novelty and therefore claim as my exclusive property, contained in the following clauses:
1. A low thickness film comprising:
a multi-layer tubular strip having:
20 to 40% by weight of at least one polyamide,
from 0.01 to 10% by weight of ethyl vinyl alcohol,
from 10% to 15% by weight of a sealing agent, and
at least 20% by weight of at least one poly olefin;
wherein the low thickness film has a uniform thickness of between 0.4 to 0.7 mil per every centimeter of a depth of a tray;
wherein the multi-layer tubular strip is:
co-extruded to produce a multi-layer co-extruded tubular strip;
the multi-layer co-extruded tubular strip is cooled by immersing the strip in water until the multi-layer co-extruded strip reaches a temperature between 10 to 50° C. to obtain an amorphous multi-layer tubular strip;

the amorphous multi-layer tubular strip is heated at a temperature of between 70 to 90° C. producing a heated strip;

the heated strip is expanded in two directions to obtain a dimension that covers a perimeter of the tray; and the expanded strip is thermo-shrinked from 30 to 50% of the expanded strip until reaching the dimension of the tray.

2. The low thickness film in accordance with claim 1 wherein the polyamide is selected from the group consisting of a Nylon 6 homopolymer, a Nylon 6/66 copolymer, and a Nylon 6/12 copolymer.

3. The low thickness film in accordance with claim 1 wherein the ethyl vinyl alcohol includes a copolymer with at least 35% mol of ethyl vinyl alcohol.

4. The low thickness film in accordance with claim 1, wherein the sealing agent is selected from the group consisting of a vinyl acetate polymer with a modified anhydrous ethylene or a modified polyolefin with a functional group that promotes adherence to plastic materials.

5. The low thickness film in accordance with claim 1 wherein the polyolefin is selected group consisting of a low density polyethylene (LDPE), a linear low density polyethylene (LLDPE), and metallocene.

6. The low thickness film in accordance with claim 1, wherein the film has a thermo-shrinking degree of from 5 to 30% when immersed in a water bath at 80° C. for at least 1 second.

* * * * *